United States Patent
Polozola et al.

(10) Patent No.: US 7,519,375 B2
(45) Date of Patent: Apr. 14, 2009

(54) INFORMATION DISSEMINATION SYSTEMS AND METHODS FOR USE IN A CONTROLLED ENVIRONMENT FACILITY

(75) Inventors: Michelle L. Polozola, Richardson, TX (US); Arthur Heckel, Little Falls, NJ (US)

(73) Assignee: Evercom Systems, Inc., Dallas, TX (US)

( * ) Notice: Subject to any disclaimer, the term of this patent is extended or adjusted under 35 U.S.C. 154(b) by 375 days.

(21) Appl. No.: 11/479,950

(22) Filed: Jun. 30, 2006

(65) Prior Publication Data

US 2008/0039053 A1    Feb. 14, 2008

(51) Int. Cl.
*H04Q 7/20*    (2006.01)

(52) U.S. Cl. ............... 455/456.1; 455/404.1; 455/456.5

(58) Field of Classification Search ............... 379/88.12
See application file for complete search history.

(56) References Cited

U.S. PATENT DOCUMENTS

| | | | |
|---|---|---|---|
| 5,977,913 A | | 11/1999 | Christ |
| 6,320,534 B1 * | | 11/2001 | Goss ................ 342/357.1 |
| 6,484,033 B2 * | | 11/2002 | Murray ................ 455/456.3 |
| 6,611,556 B1 | | 8/2003 | Koerner et al. |
| 6,665,380 B1 | | 12/2003 | Cree et al. |
| 6,668,045 B1 | | 12/2003 | Mow |
| 6,720,922 B2 * | | 4/2004 | Williams et al. ............ 342/465 |
| 6,721,398 B1 | | 4/2004 | Pitcher |
| 6,836,540 B2 | | 12/2004 | Falcone et al. |
| 6,847,892 B2 | | 1/2005 | Zhou et al. |
| 6,937,154 B2 | | 8/2005 | Zeps et al. |
| 6,972,684 B2 | | 12/2005 | Copley |
| 7,015,817 B2 * | | 3/2006 | Copley et al. ............ 340/573.4 |
| 7,042,992 B1 | | 5/2006 | Falcone et al. |
| 2002/0194096 A1 | | 12/2002 | Falcone et al. |
| 2003/0184475 A1 * | | 10/2003 | Williams et al. ............ 342/465 |
| 2004/0128310 A1 | | 7/2004 | Zmudzinski et al. |
| 2005/0068169 A1 * | | 3/2005 | Copley et al. ............ 340/539.13 |
| 2005/0068181 A1 | | 3/2005 | Wang |
| 2005/0270170 A1 * | | 12/2005 | Krumm et al. ............ 340/825.49 |
| 2006/0121916 A1 * | | 6/2006 | Aborn et al. ............ 455/456.5 |
| 2007/0298758 A1 * | | 12/2007 | Verma et al. ............ 455/404.1 |

OTHER PUBLICATIONS

International Search Report and Written Opinion of the International Searching Authority for International Application No. PCT/US 07/72564 dated Jan. 24, 2008.

(Continued)

*Primary Examiner*—Creighton Smith
(74) *Attorney, Agent, or Firm*—Slater & Matsil, L.L.P.

(57) ABSTRACT

Embodiments are provided for managing notification of residents of a controlled-environment facility of pending messages awaiting retrieval by such residents. In one embodiment, a messaging system is provided in which a party external to the controlled-environment facility may record a message intended for a resident of the controlled-environment facility. A notification controller receives notification of the pending message for the resident and determines an appropriate communication device to use for notifying the resident of the pending message. In certain embodiments, a wireless location tracking system, such as a Radio Frequency Identification (RFID) system, is employed to determine a communication device that is in the vicinity of the resident, wherein the notification controller directs notification of the pending message to the determined communication device.

34 Claims, 6 Drawing Sheets

OTHER PUBLICATIONS

Extended Search Report for European Patent Application No. 07252643.7, "Information Dissemination Systems and Methods for Use in a Controlled-Environment Facility", Evercom Systems, Jan. 24, 2008, 9 pages.
U.S. Appl. No. 10/135,878, filed Apr. 29, 2002.
U.S. Appl. No. 10/602,233, filed Jun. 24, 2003.
U.S. Appl. No. 10/640,505, filed Aug. 13, 2003.
U.S. Appl. No. 10/642,532, filed Aug. 15, 2003.
U.S. Appl. No. 10/720,732, filed Nov. 24, 2003.
U.S. Appl. No. 10/720,848, filed Nov. 24, 2003.
U.S. Appl. No. 10/947,986, filed Sep. 23, 2004.
U.S. Appl. No. 10/954,935, filed Sep. 30, 2004.
U.S. Appl. No. 11/125,842, filed May 10, 2005.
U.S. Appl. No. 11/182,625, filed Jul. 15, 2005.
U.S. Appl. No. 11/356,734, filed Feb. 17, 2006.
U.S. Appl. No. 11/386,032, filed Mar. 21, 2006.
European Search Report dated Nov. 9, 2007.

* cited by examiner

INFORMATION DISSEMINATION SYSTEMS AND METHODS FOR USE IN A CONTROLLED ENVIRONMENT FACILITY

CROSS-REFERENCE TO RELATED APPLICATIONS

This application is related to the following concurrently filed and commonly assigned U.S. patent applications: Ser. No. 11/479,990, titled "SYSTEMS AND METHODS FOR ACQUIRING, ACCESSING, AND ANALYZING INVESTIGATIVE INFORMATION", Ser. No. 11/480,268, titled "SYSTEMS AND METHODS FOR ACQUIRING, ACCESSING, AND ANALYZING INVESTIGATIVE INFORMATION", and Ser. No. 11/480,264, titled "SYSTEMS AND METHOD FOR ACCOUNT ESTABLISHMENT AND TRANSACTION MANAGEMENT USING INTERRUPT MESSAGING." This Application is also related to the following and commonly assigned U.S. patent applications: Ser. No. 10/135,878 filed Apr. 29, 2002, titled "INFORMATION MANAGEMENT SYSTEM AND METHOD", Ser. No. 10/720,732 filed Nov. 24, 2003, titled "INFORMATION MANAGEMENT AND MOVEMENT SYSTEM AND METHOD", Ser. No. 10/720,848 filed Nov. 24, 2003, titled "INFORMATION MANAGEMENT AND MOVEMENT SYSTEM AND METHOD", Ser. No. 11/182,625 filed Jul. 15, 2005, titled "SYSTEMS AND METHODS FOR ACQUIRING, ACCESSING, AND ANALYZING INVESTIGATIVE INFORMATION", Ser. No. 11/125,842 filed May 10, 2005, titled "PROCESSOR-BASED SELF-SERVICE TERMINALS USED WITH RESPECT TO CONTROLLED ENVIRONMENT FACILITIES", Ser. No. 10/135,883, now Published Application 2002/0194096, published Dec. 19, 2002, titled "OPTIMIZING PROFITABILITY IN BUSINESS TRANSACTIONS", Ser. No. 10/947,986 filed Sep. 23, 2004, titled "OPTIMIZING PROFITABILITY IN BUSINESS TRANSACTIONS", Ser. No. 11/386,032 filed Mar. 21, 2006, titled "SYSTEMS AND METHOD FOR ACCOUNT ESTABLISHMENT AND TRANSACTION MANAGEMENT USING INTERRUPT MESSAGING", Ser. No. 10/602,233 filed Jun. 24, 2003, titled "TRANSACTION AND INFORMATION MANAGEMENT ENGINE", Ser. No. 10/640,505 filed Aug. 13, 2003 titled "SYSTEM AND METHOD FOR CALLED PARTY CONTROLLED MESSAGE DELIVERY", Ser. No. 10/642,532 filed Aug. 15, 2003, titled "CENTRALIZED CALL PROCESSING", Ser. No. 10/954,935 filed Sep. 30, 2004, titled "SYSTEM AND METHODS FOR PROCESSING CALLS DIRECTED TO TELEPHONES HAVING A PORTABLE INTERFACE", and Ser. No. 11/356,734 filed Feb. 17, 2006, titled "WIRELESS COMMUNICATIONS CONTROL IN A CONTROLLED ENVIRONMENT FACILITY". This Application is also related to the following U.S. Pat. No.: 6,836,540 issued Dec. 28, 2004, titled "SYSTEMS AND METHODS FOR OFFERING A SERVICE TO A PARTY ASSOCIATED WITH A BLOCKED CALL", and U.S. Pat. No. 7,042,992 issued May 9, 2006, titled "SYSTEMS AND METHOD FOR ACCOUNT ESTABLISHMENT AND TRANSACTION MANAGEMENT USING INTERRUPT MESSAGING", the disclosures of which is hereby incorporated herein by reference.

TECHNICAL FIELD

The following description relates generally to information dissemination systems and methods, and more particularly to systems and methods for notifying residents of a controlled-environment facility of pending messages for such residents.

BACKGROUND OF THE INVENTION

Inmates of correctional facilities, such as jails, prisons, stockades, penitentiaries, etc., are often permitted some communication with other parties. For instance, inmates are typically permitted to make telephone calls to parties outside the correctional facility. Of course, such telephone calls are generally restricted. For example, a correctional facility's telephone system will generally not permit an inmate to place calls to certain parties on a restricted list, such as an inmate's crime victim, a judge, parties with insufficient credit rating, etc. Further, the telephone calls are typically recorded and/or monitored.

Calls from parties outside a correctional facility to inmates of the facility have traditionally not been permitted. However, messaging systems that allow a party outside the correctional facility to record a message that may be retrieved by an inmate of the correctional facility have been developed, see e.g., U.S. Pat. Nos. 6,668,045 and 6,665,380, the disclosures of which are hereby incorporated herein by reference. Thus, for instance, a party outside the correctional facility may record a message for a particular inmate, and the particular inmate may later retrieve the recorded message.

However, traditional techniques of notifying inmates of pending messages (i.e., messages that have been recorded and are awaiting the inmate's retrieval thereof) have been inefficient or otherwise problematic. For instance, in one technique inmates are not notified of pending messages, but are instead required to periodically call the messaging system to determine whether any messages are awaiting the inmate's retrieval.

According to another technique, a system administrator is informed by the messaging system of pending messages for inmates, and the system administrator then informs the respective inmates. Of course, this technique undesirably consumes time of the system administrator, and inmates awaiting messages are reliant upon the system administrator taking the time to inform them. Further, the inmates may become impatient and periodically interrupt the system administrator to inquire as to whether they have a message, which further detracts the system administrator's attention away from other duties.

The issue of messaging is particularly problematic with detainees. Detainees, in general, are relatively new inmates that have not yet been processed to become long-term residents of a correctional facility. For instance, typically detainees do not have personal identification numbers and/or other information assigned to them within the correctional facility's system, as long-term inmates typically have. When initially arrested, a detainee may be held (e.g., in a holding area or holding cell) and may be permitted to make calls to, for example, an attorney, family member, bail bondsman, etc. Often, the detainee will desire to receive messages from parties outside the correctional facility to, for instance, learn the status of obtaining bond (or "bail") for release from the correctional facility, etc. Many detainees are released from the correctional facility (typically after they post bail) within 24 hours of being arrested.

The detainees are often in high-stress situations and are therefore upset and frustrated at being unable to easily communicate with persons outside the correctional facility. This is especially true for locations that do not have a bail bondsman, in which the detainees are fully reliant on friends or family members to obtain the necessary funds for bail. A detainee may, for example, call a family member to notify the family member of the detainee's arrest and to request the family member's help in obtaining funds for posting a bond so that the detainee may be released from the correctional facility. Because the family member is not permitted to place a return call directly to the detainee, the detainee will typically have to await the family member to leave the detainee a message (e.g., regarding the status of obtaining the funds, etc.), which the detainee can retrieve from the messaging system.

Further, inmates or detainees may have difficulty getting in touch with a party outside the correctional facility, such as a family member, to, for instance, request help with obtaining funds for bail, etc. And, once an inmate or detainee receives a message from such a party outside the correctional facility, it may be difficult for the inmate or detainee to get back in touch with the outside party once again, if so desired. For instance, the inmate or detainee may not know the best contact information (e.g., telephone number) to use for reaching the outside party, the outside party may be away from his/her telephone (and thus unable to accept charges for a call from the inmate or detainee, etc. Thus, the difficulty in exchanging information with parties outside the correctional facility may cause unnecessary delays and/or added stress (and thus potentially result in behavioral problems) with inmates/detainees.

In view of the above, a desire exists for improved systems and methods for information dissemination, such as notifying inmates or detainees of pending messages and/or enabling inmates or detainees to leave messages for outside parties and notifying the outside parties of such pending messages.

BRIEF SUMMARY OF THE INVENTION

The present invention is directed generally to systems and methods for disseminating information in a controlled-environment facility. More particularly, embodiments are provided for managing notification of residents of a controlled-environment facility of pending messages awaiting retrieval by such residents. For example, in one embodiment, a messaging system is provided in which a party external to the controlled-environment facility may record a message intended for a resident of the controlled-environment facility. A notification controller receives notification of the pending message for the resident and determines an appropriate communication device to use for notifying the resident of the pending message. In certain embodiments, the notification controller determines an appropriate communication device to use for notifying the resident based on monitored activity of the resident, such as based on the current location of the resident within the facility and/or based on a communication device that the resident is currently using. As one example, in certain embodiments, a wireless location tracking system, such as a Radio Frequency Identification (RFID) system, is employed to determine a communication device that is in the vicinity of the resident, wherein the notification controller directs notification of the pending message to the determined communication device. Such a communication device that is used for notifying a resident of a pending message may be a message board, telephone, or other suitable communication device.

According to certain embodiments, a payment arrangement may be established with the calling party for charging the calling party for recording a message for a resident. Further, in certain embodiments, a resident may be permitted to respond to a message by recording a return message for the calling party. In certain embodiments, a notification controller may manage notification to the calling party of the pending return message from the resident. Further, in certain embodiments, the calling party may be charged for retrieving the message from the resident, rather than the resident being charged for recording the return message.

Thus, certain embodiments provide several advantages. First, the above-mentioned notification controller alleviates administrative personnel from the burden of performing the notification task. Further, the notification controller reduces interruptions to administrative personnel by inmates because the inmates can be made aware that notification of pending messages are automatically sent to the communication devices without involvement of the administrative personnel. Further still, such embodiments may act as a behavior suppressant because inmates passively wait for notification of a pending message by a communication device (e.g., message board). For instance, if message notifications are presented on a message board, inmates may sit and watch the message board for their name, thus suppressing unwanted behavior of the inmates. Further still, certain embodiments enhance the ability for residents to communicate (e.g., via return messages) information to parties outside the controlled-environment facility.

Embodiments of the present invention have particular applicability within controlled-environment facilities for notifying residents thereof of pending messages. Examples of controlled-environment facilities include correctional facilities (e.g., municipal jails, county jails, state prisons, federal prisons, military stockades, juvenile facilities, detention camps, and home incarceration environments), healthcare facilities (e.g., hospitals, nursing homes, mental health facilities, and rehabilitation facilities, such as drug and alcohol rehabilitation facilities), restricted living quarters (e.g., hotels, resorts, camps, dormitories, and barracks), and the like. Certain controlled-environment facilities may be thought of as a small community or city, perhaps walled or otherwise access restricted, wherein various activities occur within the community and between the community and those outside the community in the daily operation thereof. Such a community may include a number of individuals and enterprises directly associated therewith, including management, staff, and inmates, residents, patients, or guests (herein referred to as "residents"), and a number of individuals and enterprises indirectly associated therewith, including friends and family of residents, vendors, government agencies, providers of services to residents, and individuals with a connection to the facility or its residents.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Figure 1:
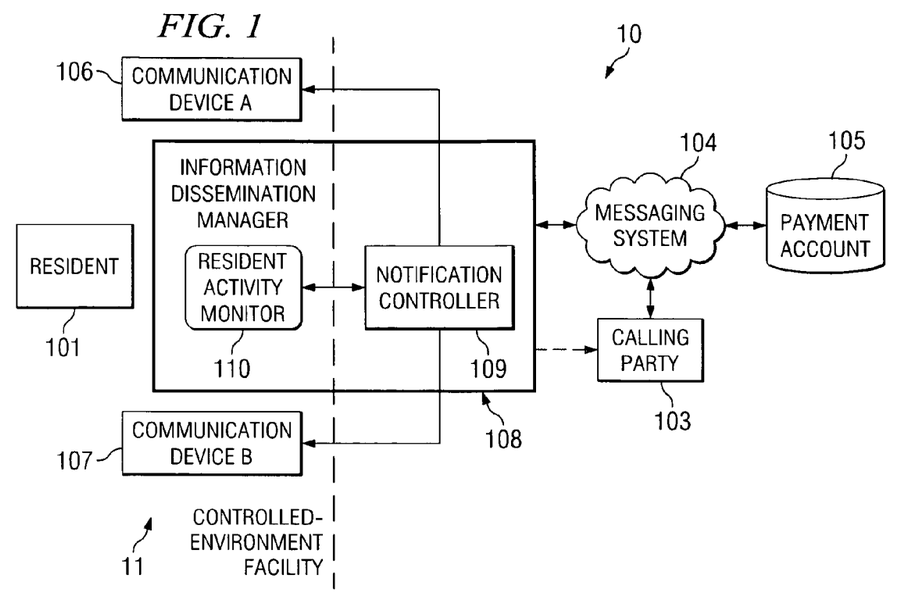
FIG. 1 shows an exemplary system for managing dissemination of information according to one embodiment of the present invention.

Turning to FIG. 1, an exemplary system 10 for managing dissemination of information according to one embodiment is shown. System 10 comprises a messaging system 104 with which a calling party 103 (e.g., that is external to a controlled-environment facility 11, such as a correctional facility) may interact to record a message for a resident of the facility (e.g., an inmate of a correctional facility), such as resident 101. Messaging system 104 may be any system now known or later developed that enables a caller to record a message for another party, such as the exemplary messaging systems disclosed in U.S. Pat. Nos. 6,668,045 and 6,665,380 as examples. Messaging system 104 may be communicatively coupled to the controlled-environment facility via a communication network, which may comprise the Internet or other Wide Area Network (WAN), public-switched telephony network, Local Area Network (LAN), wireless network, a combination of the foregoing, and/or other communication networks now known or later developed.

System 10 also comprises an information dissemination manager 108, which is a system that manages, for instance, notification of residents of pending messages and/or notification of outside parties (e.g., calling party 103) of pending messages. Accordingly, in this example, information dissemination manager 108 comprises notification controller 109 and resident activity monitor 110. Information dissemination manager 108 is illustrated on the dashed line that separates the controlled-environment facility 11 from the outside world, as the information dissemination manager 108 may be implemented in whole or in part either internal or external to such controlled-environment facility 11, as discussed further herein.

In this example, controlled-environment facility 11 comprises communication devices 106 and 107, each of which may be any communication device that is capable of notifying an inmate of an awaiting message, such as a message board, telephone, electronic messaging device (e.g., computer capable of receiving an email message, etc.). While two communication devices are shown in this example for ease of illustration, it should be understood that any number of such communication devices may be included in a given implementation. In this embodiment, resident activity monitor 110 may monitor some activity of the resident, such as tracking the resident's location in the facility, monitoring which communication device a resident is currently using, etc., and based at least in part on such monitored activity, the notification controller 109 determines which communication device (e.g., which of communication devices 106 and 107) should be used to notify a given resident of a message pending in messaging system 104 for such given resident.

In operation of this exemplary embodiment, a calling party 103 may call to messaging system 104 and record a message for resident 101. In certain embodiments, the calling party 103 may be required to first make some payment arrangement, such as establishing a payment account 105 (e.g., pre-funding an account, providing a credit card number with authorization to charge the card for payment, etc.), and the messaging system 104 may charge the calling party 103 for recording a message. In certain embodiments, in addition to establishing payment account 105, contact information for the calling party 103 may be obtained, which may be used to enable notification of the calling party of a return message from resident 101, as described further below.

In this exemplary embodiment, notification controller 109 receives information about pending messages in messaging system 104. Thus, once calling party 103 records a message for resident 101 in messaging system 104, notification controller 109 determines that such message is pending in messaging system 104 for resident 101. In certain embodiments, messaging system 104 pushes information to notification controller 109 (e.g., upon a message being recorded for a resident of a facility for which notification controller 109 is responsible for managing message notifications) to notify the notification controller 109 of a pending message, while in other embodiments notification controller 109 may periodically query messaging system 104 for any pending messages for residents of the facility for which notification controller 109 is responsible for managing message notifications.

Figure 4:
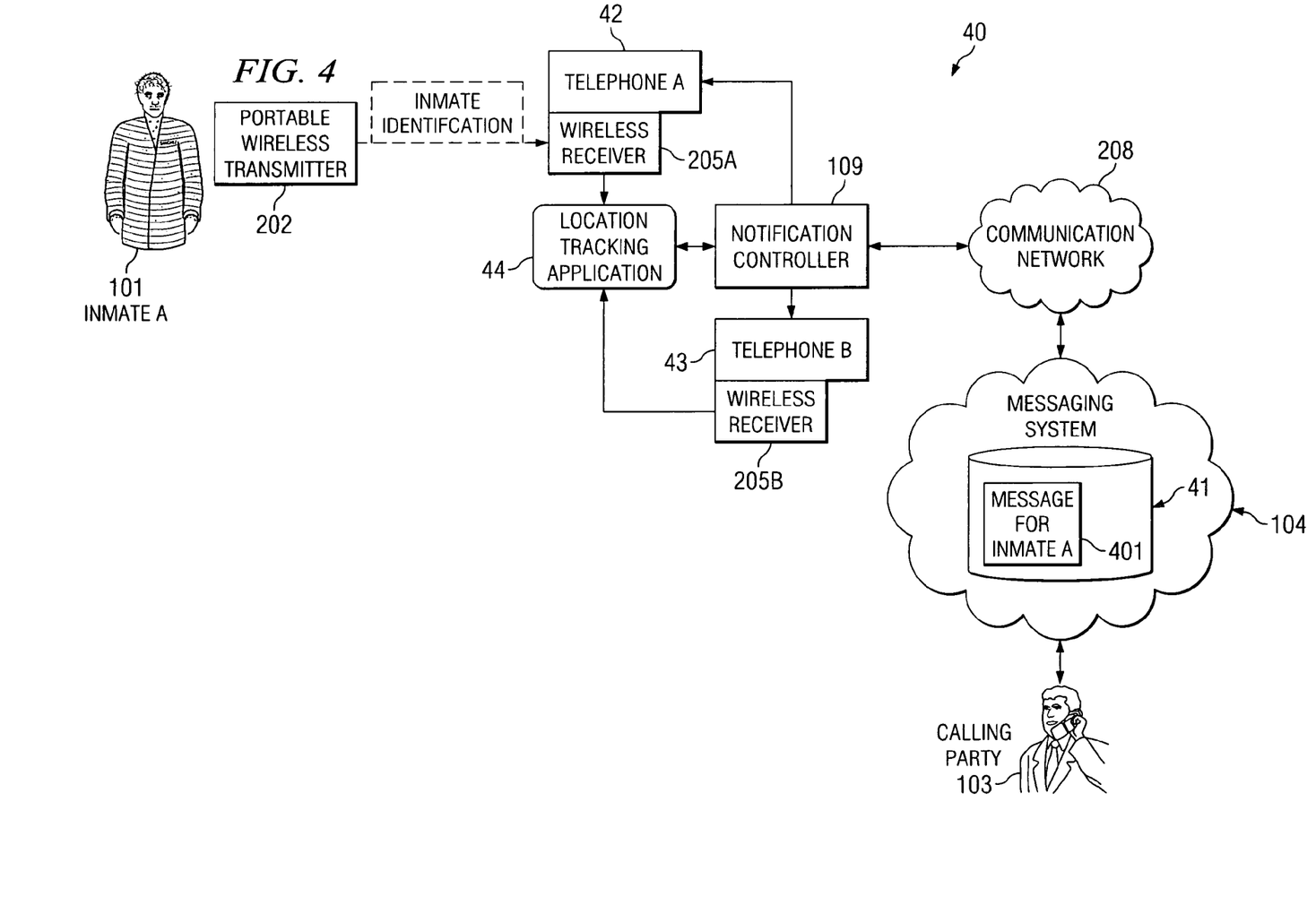
FIG. 4 shows an exemplary system according to one embodiment of the present invention.

Also, notification controller 109 receives information from resident activity monitor 110 regarding the monitored activity of resident 101. Activity monitor 110 may, in certain embodiments, track the location of residents via wireless tracking system, such as radio frequency identification (RFID), and such location information may be supplied to notification controller 109. In certain embodiments, the location of residents may be tracked using other techniques, such as by having residents swipe an identification card through a card reader, entering an identification number on a keypad, and/or otherwise inputting information identifying the resident when the resident enters different locations of the facility. In certain embodiments, activity monitor 110 may monitor whether a given resident is currently using a communication device (e.g., telephone), and if so, which communication device the resident is using.

Notification controller 109 may utilize the activity information received from activity monitor 110 to determine which of a plurality of different communication devices (e.g., devices 106 and 107) to use to notify the resident 101 of a pending message. For instance, location information may be used in certain embodiments to determine a nearest communication device to which notification should be directed. As another example, information identifying a communication device that the resident 101 is currently using may be used to enable the notification controller 109 to use such communication device to notify the resident of a pending message (e.g., the resident's communication may be interrupted so as to inform the resident of a pending message).

Once notified of a pending message, resident 101 may access messaging system 104 and retrieve (e.g., listen to) the pending message. Further, in certain embodiments, resident 101 may record a return message for the calling party 103. Also, if such a return message is recorded for the calling party 103, in certain embodiments notification controller 109 may receive notification of such pending message and attempt to contact the calling party 103 (e.g., using the stored contact information for the calling party) to notify the calling party 103 of the pending message. The calling party 103 may call the messaging system 104 (or notification controller 109 may connect the calling party 103 to messaging system 104) whereby the calling party can then retrieve (e.g., listen to) such pending message. In certain embodiments, the resident 101 is not charged for recording a return message for the calling party 103, but instead the calling party 103 may be charged (e.g., via payment account 105) for retrieving a message from resident 101. Exemplary techniques for implementing such a return messaging system are described further in co-pending and commonly assigned U.S. patent application Ser. No. 10/640,505, the disclosure of which is hereby incorporated herein by reference.

The above exemplary embodiment provides several advantages. First, it alleviates administrative personnel of the controlled-environment facility from the burden of performing the task of notifying residents of pending messages. Further, it reduces interruptions to administrative personnel by residents because the residents can be made aware that notification of pending messages are automatically sent to the communication devices without involvement of the administrative personnel. Further still, such embodiments may act as a behavior suppressant because residents passively wait for notification of a pending message by a notification device (e.g., message board). For instance, if message notifications are presented on a message board, residents may sit and watch the message board for their name, thus suppressing unwanted behavior of the residents. Further, the above embodiment improves the ability for the resident to record a message for an outside party (e.g., calling party 103) and enables the outside party to be timely notified of such pending message.

Figure 2:
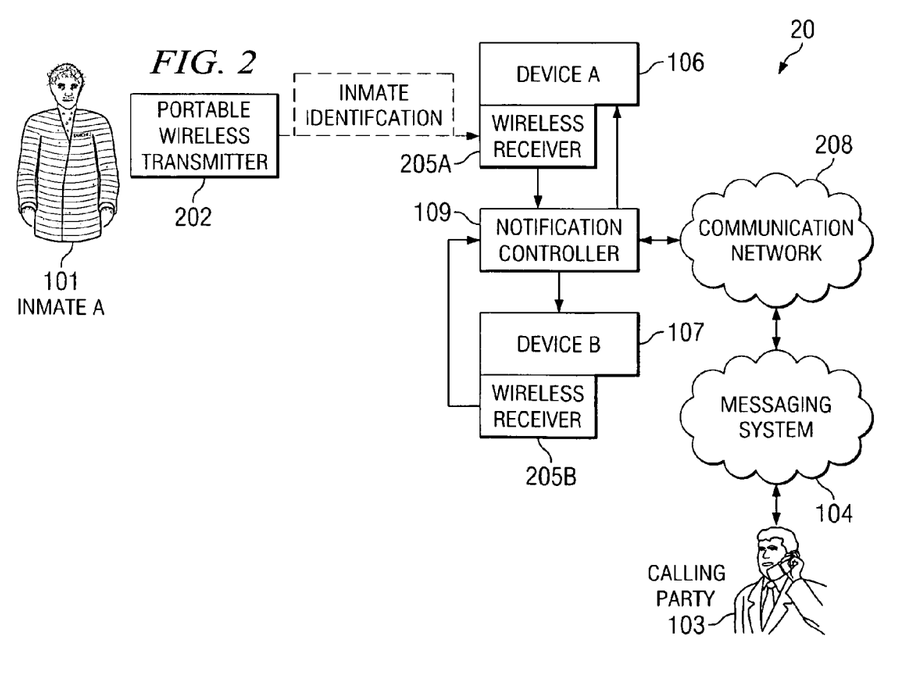
FIG. 2 shows an exemplary system according to one embodiment of the present invention.

Turning to FIG. 2, an exemplary system 20 according to one embodiment is shown. In this exemplary embodiment, resident 101 is an inmate of a correctional facility, such as a prison; of course, this is merely an example and the exemplary system 20 may likewise be applied to any other controlled-environment facilities, and therefore system 20 is not limited to correctional facilities. As with system 10 described above, system 20 comprises a messaging system 104 with which a calling party 103 (e.g., that is external to the correctional facility) may interact to record a message for an inmate of the correctional facility, such as inmate 101. Messaging system 104 may be communicatively coupled to the correctional facility via a communication network 208, which may comprise the Internet or other Wide Area Network (WAN), public-switched telephony network, Local Area Network (LAN), wireless network, a combination of the foregoing, and/or other communication networks now known or later developed.

System 20 also comprises notification controller 109, and one or more communication devices, such as communication devices 106 and 107, that have wireless receivers associated therewith, such as wireless receivers 205A and 205B. Communication devices 106 and 107 may be any communication device that is capable of notifying an inmate of an awaiting message, such as a message board, telephone, electronic messaging device (e.g., computer capable of receiving an email message, etc.). Wireless receivers 205A and 205B may each be any wireless receiver now known or later developed that is operable to receive wireless communication that identifies an inmate, as discussed further herein. While two communication devices with associated wireless receivers are shown in this example for ease of illustration, it should be understood that any number of communication devices (e.g., telephones, message boards, etc.) having associated wireless receivers may be included in a given implementation.

A portable wireless transmitter 202 is associated with inmate 101. Various techniques for associating a portable wireless transmitter 202 with an inmate 101 are described further herein. As one example, inmate 101 wears a bracelet or badge that includes the portable wireless transmitter 202 incorporated therein. Wireless transmitter 202 may be any portable wireless transmitter now known or later developed that is operable to transmit wireless communication that identifies a corresponding inmate 101, as discussed further herein.

In certain embodiments, wireless receivers 205A and 205B and portable wireless transmitter 202 implement radio frequency identification (RFID) technology. RFID technology, sometimes called dedicated short range communication (DSRC), is well known, and is therefore only briefly described herein. In general, RFID is a technology that incorporates the use of electromagnetic or electrostatic coupling in the radio frequency (RF) portion of the electromagnetic spectrum to uniquely identify an object, animal, or person, such as an inmate 101. Typically, RFID does not require direct contact or line-of-sight scanning. In general, an RFID system has three components: an antenna and transceiver (often combined into one reader) and a transponder (sometimes referred to as "the tag"). The antenna uses RF waves to transmit a signal that activates the transponder (or tag). When activated, the transponder transmits data back to the antenna. The data may be used to notify a programmable logic controller that an action should occur. In known applications, the action may comprise raising an access gate or interfacing with a database to carry out a monetary transaction, as examples. Low-frequency RFID systems (30 KHz to 500 KHz) have short transmission ranges (generally less than six feet), while high-frequency RFID systems (850 MHz to 950 MHz and 2.4 GHz to 2.5 GHz) offer longer transmission ranges (more than 90 feet). As an example of one implementation, wireless receivers 205A and 205B may each implement the above-mentioned antenna and transceiver, while portable wireless transmitter 202 implements the above-mentioned transponder (or tag). Thus, wireless transmitter 202 broadly refers to any device capable of transmitting information wirelessly, and in certain embodiments is a transponder (or tag), such as in an RFID system.

In operation of certain embodiments of the present invention, portable wireless transmitter 202 (e.g., RFID transponder) is operable to communicate information to a wireless receiver (e.g., RFID antenna and transceiver) when the wireless transmitter 202 is brought into the vicinity of such wireless receiver. The information communicated may include an identification of a corresponding inmate 101 with whom the wireless transmitter 202 is associated, as well as other information about the inmate if so desired. Thus, when inmate 101's associated wireless transmitter 202 is in the vicinity of wireless receiver 205A (as shown in FIG. 2), wireless transmitter 202 communicates information to wireless receiver 205A identifying inmate 101. When wireless receiver 205A receives such communication, it can be determined (e.g., by notification controller 109 or other logic that is communicatively coupled to wireless receivers 205A and 205B, such as location tracking application 44 of FIG. 4 described below)

that inmate 101 is in the vicinity of communication device 106 associated with wireless receiver 205A. Similarly, if inmate 101 and the inmate's associated portable wireless transmitter 202 are in the vicinity of communication device 107, communication device 107's associated wireless receiver 205B receives communication from portable wireless transmitter 202 identifying inmate 101. Accordingly, it can be determined from such communication that inmate 101 is in the vicinity of communication device 107 associated with wireless receiver 205B. As such, notification controller 109 can determine which of communication devices 106 and 107 to direct notification of a pending message for inmate 101 based on which of the communication devices inmate 101 is nearest.

In this exemplary embodiment, notification controller 109 receives information about pending messages in messaging system 104. Thus, if calling party 103 records a message for inmate 101 in messaging system 104, notification controller 109 determines that such message is pending in messaging system 104 for inmate 101. In certain embodiments, messaging system 104 pushes information to notification controller 109 (e.g., upon a message being recorded for an inmate of a facility for which notification controller 109 is responsible for managing message notifications) to notify the notification controller 109 of a pending message, while in other embodiments notification controller 109 may periodically query messaging system 104 for any pending messages for inmates of the facility for which notification controller 109 is responsible for managing message notifications.

Also, notification controller 109 receives information regarding the location of inmates. In certain embodiments, notification controller 109 receives information from wireless receivers 205A and 205B regarding inmate(s) that are in the vicinity of corresponding communication devices. In other embodiments, notification controller 109 receives location information from a location tracking application 44 (FIG. 4) that monitors the wireless receivers 205A and 205B. Thus, the notification controller 109 can monitor whether an inmate for which a message is pending in messaging system 104 is in the vicinity of a communication device; and upon determining that an inmate is in the vicinity of a communication device, notification controller 109 can trigger the corresponding communication device to notify the inmate of the pending message.

In certain embodiments, upon being informed of the pending message, the inmate can call into the messaging system 104 to retrieve the pending message. Further, as discussed above, in certain embodiments, the inmate 101 may record a message for calling party 103 in messaging system 104, whereby in certain embodiments, notification controller 109 notified calling party 103 of the pending message.

Figure 3:
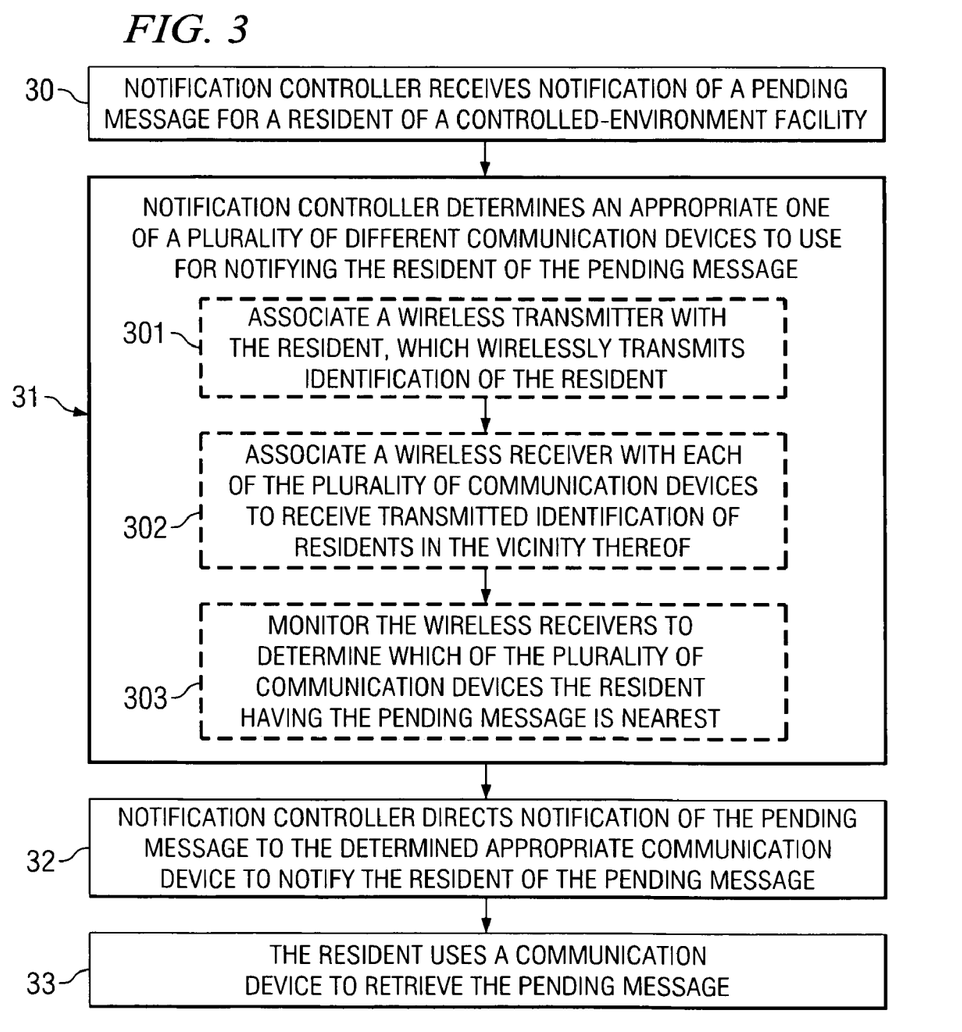
FIG. 3 shows an operational flow diagram according to one embodiment of the present invention.

FIG. 3 shows an operational flow diagram according to one embodiment of the present invention. In operational block 30, notification controller 109 receives notification of a pending message for a resident of a controlled-environment facility. As described further herein, a resident may be an inmate or detainee of a correctional facility, or a resident of some other type of controlled-environment facility. Notification controller 109 may receive notification of a message pending for the resident in a messaging system by polling the messaging system for such information, or the messaging system may push such information to the notification controller.

In block 31, notification controller 109 determines an appropriate one of a plurality of different communication devices to use for notifying the resident of the pending message. As described above in FIG. 2, in certain embodiments a wireless location tracking system may be used to determine which of the plurality of different communication devices a resident is nearest. In certain embodiments, the notification controller may additionally or alternatively use other information, such as status information for the resident (e.g., whether the resident is a detainee or an inmate), identification of a communication device currently in use by the resident, etc., to determine the appropriate communication device to which notification of the pending message is to be directed. One exemplary technique that may be used for determining the appropriate communication device is illustrated in dashed optional blocks 301-303. In block 301, a wireless transmitter is associated with a resident, which is operable to wirelessly transmit identification of the resident. In block 302, a wireless receiver is associated with each of the plurality of communication devices to receive transmitted identification of residents in the vicinity thereof. And, in block 303, the wireless receivers are monitored (e.g., by notification controller 109 or location tracking application 44 of FIG. 4 described below) to determine which of the plurality of communication devices the resident having the pending message is nearest.

In operational block 32, the notification controller 109 directs notification of the pending message to the determined appropriate communication device to notify the resident of the pending message. Such notification may be a call to a telephone that is determined appropriate (e.g., that is nearest the resident) in order to play a message to the resident informing the resident of the pending message. Alternatively or additionally, such notification may be a text message that is output on a message board to notify the resident of the pending message (which may include instructions regarding how the resident may retrieve the pending message). In operational block 33, the resident may use a communication device, such as a telephone, to retrieve the pending message from the messaging system.

Turning to FIG. 4, an exemplary system 40 according to one embodiment of the present invention is shown. As discussed above with system 20 of FIG. 2, system 40 comprises inmate 101 having a portable wireless transmitter 202 associated therewith, calling party 103, messaging system 104, communication network 208, and notification controller 109. In this example, telephones 42 and 43 are provided as communication devices (e.g., communication devices 105A and 105B of FIG. 1), which have wireless receivers 205A and 205B associated therewith, respectively. Calling party 103 (e.g., that is external to a correctional facility) interacts with messaging system 104 to record a message 401 for inmate 101, which is stored to data storage 41. Data storage 41 may comprise memory, hard disk, optical disc (e.g., CD or DVD), magnetic disk (e.g., floppy disk), tape drive, or any other computer-readable data storage now known or later developed.

In certain embodiments, a toll-free number (e.g., "800" number) may be provided to enable a calling party to access messaging system 104. In certain embodiments, the calling party may be prompted to make a payment arrangement for recording messages within messaging system 104. For instance, the messaging system 104 may enable a calling party to leave a message for a set charge, such as $10.00 per message, and/or the messaging system 104 may offer the calling party a discount for pre-paying for a plurality of messages, such as $15.00 for 3 messages. Alternatively, the messaging system 104 may charge the calling party a rate based on the length of the message, such as $0.05 for each second of the message. Of course, the messaging system 104 may charge the calling party for the recorded messages in any other manner desired. The messaging system 104 may interact with the calling party 103 via known interactive voice response (IVR) techniques to prompt the calling party to provide a credit card number and/or other form of payment. Further, the messaging system may interact with the calling party to obtain return contact information for the calling party, which may be stored in a database. Similarly, the messaging 104 may interact with the calling party 103 to enable the calling party to identify a resident for whom a message is intended. For instance, the messaging system 104 may, in certain embodiments, enable the calling party 103 to look-up a resident of a specified controlled-environment facility. For example, the calling party 103 may input (e.g., via dial tone multi-frequency (DTMF) signals, spoken voice recognizable by voice recognition technology employed by the messaging system, etc.) all or a portion of the resident's name, and the messaging system may verify (e.g., by interacting with a database of the controlled-environment facility) that the input name corresponds to a resident of the facility. Thus, messaging system 104 may index the stored messages in data storage 41 by resident.

In this exemplary embodiment, a location tracking application 44 is included, which receives information from wireless receivers 205A and 205B to track the location of inmates within a controlled-environment facility (e.g., to determine which of telephones 42 and 43 an inmate is nearest at any given time). While two telephones with associated wireless receivers are shown in this example for ease of illustration, it should be understood that any number of communication devices (e.g., telephones, message boards, etc.) having associated wireless receivers may be included in a given implementation, and each of such wireless receivers may communicate with location tracking application 44 in the manner described herein for wireless receivers 205A and 205B. In this example, location tracking application 44 may comprise a software program that is stored to computer-readable media (e.g., memory, hard disk, optical disk, magnetic disk, etc.) and executed by a processor, such as a personal computer (PC), server computer, or other processor-based computer system. Location tracking application 44 communicates information regarding inmate location to notification controller 109 to enable notification controller 109 to determine an appropriate one of telephones 42 and 43 to direct notification of a pending message for a given inmate.

In operation of the illustrated example of FIG. 4, calling party 103 calls messaging system 104 and records a message 401 for inmate 101. Notification controller 109 receives notification of the pending message for inmate 101 (e.g., by receiving information pushed thereto from messaging system 104 or by polling messaging system 104 for such information). Thus, notification controller 109 determines that a message is pending for inmate 101, and therefore attempts to determine an appropriate one of telephones 42 and 43 to utilize to inform the inmate 101 of the pending message.

In the illustrated example, inmate 101 is in the vicinity of telephone 42. Thus, portable wireless transmitter 202 (e.g., RFID transponder) communicates information identifying inmate 101 to wireless receiver (e.g., RFID antenna and transceiver) 205A, which is associated with telephone 42. Wireless receiver 205A in turn communicates information to location tracking application 44 indicating that inmate 101 is in the vicinity of such wireless receiver 205A (and thus in the vicinity of the associated telephone 42). Accordingly, location tracking application 44 can determine from such communication that inmate 101 is in the vicinity of telephone 42.

In this embodiment, notification controller 109 queries location tracking application 44 for the location of inmate 101. Responsive to such query, location tracking application 44 communicates information to controller 109 indicating that inmate 101 is in the vicinity of telephone 42. Accordingly, notification controller 109 can trigger a call to telephone 42 to notify inmate 101 of the pending message.

Figure 5:
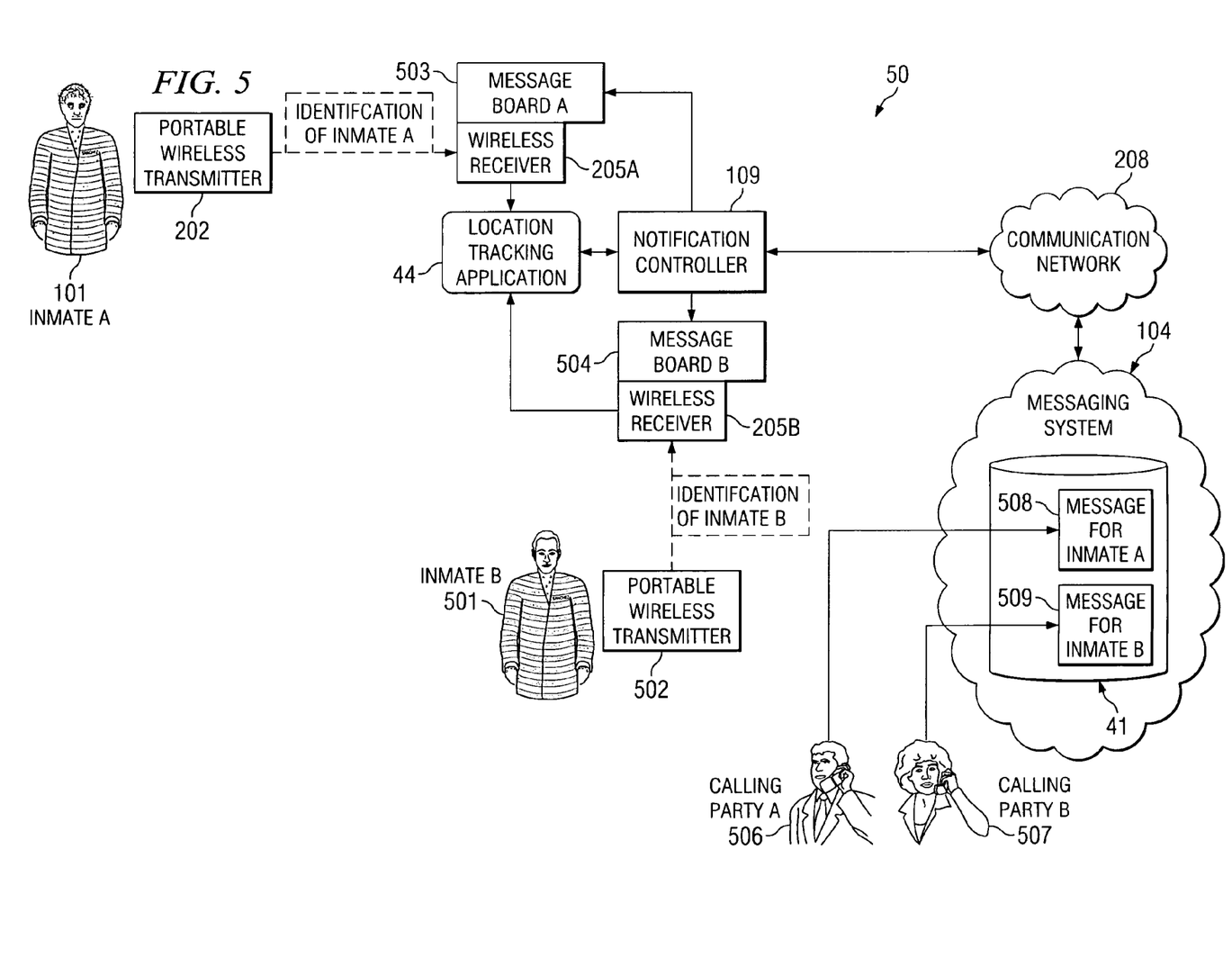
FIG. 5 shows another exemplary system according to one embodiment of the present invention.

FIG. 5 shows another exemplary system 50 according to one embodiment of the present invention. As discussed above with system 40 of FIG. 4, system 50 comprises inmate 101 having a portable wireless transmitter 202 associated therewith, messaging system 104 comprising data storage 41, communication network 208, notification controller 109, and location tracking application 44. Also shown in this example is a second inmate 501, which has an associated portable wireless transmitter 502.

In this example, message boards 503 and 504 are provided as communication devices (e.g., communication devices 105A and 105B of FIG. 1), which have wireless receivers 205A and 205B associated therewith, respectively. In the illustrated example, calling party 506 (e.g., that is external to a correctional facility) interacts with messaging system 104 to record a message 508 for inmate 101, which is stored to data storage 41. Similarly, calling party 507 (e.g., that is external to a correctional facility) interacts with messaging system 104 to record a message 509 for inmate 501, which is stored to data storage 41.

Location tracking application 44 receives information from wireless receivers 205A and 205B to track the location of inmates within a controlled-environment facility (e.g., to determine which of message boards 503 and 504 an inmate is nearest at any given time). While two message boards with associated wireless receivers are shown in this example for ease of illustration, it should be understood that any number of communication devices (e.g., telephones, message boards, etc.) having associated wireless receivers may be included in a given implementation, and each of such wireless receivers may communicate with location tracking application 44 in the manner described herein for wireless receivers 205A and 205B. Location tracking application 44 communicates information regarding inmate location to notification controller 109 to enable notification controller 109 to determine an appropriate one of message boards 503 and 504 to direct notification of a pending message for a given inmate.

In operation of the illustrated example of FIG. 5, notification controller 109 receives notification of the pending messages 508 and 509 for inmates 101 and 504 (e.g., by receiving information pushed thereto from messaging system 104 or by polling messaging system 104 for such information). Thus, notification controller 109 determines that a message is pending for inmates 101 and 501, and therefore attempts to determine an appropriate one of message boards 503 and 504 to utilize to inform the inmates 101 and 501 of their respective pending messages.

In the illustrated example, inmate 101 is in the vicinity of message board 503, while inmate 501 is in the vicinity of message board 504. Thus, portable wireless transmitter 202 (e.g., RFID transponder) associated with inmate 101 communicates information identifying inmate 101 to wireless receiver (e.g., RFID antenna and transceiver) 205A, which is associated with message board 503. Wireless receiver 205A in turn communicates information to location tracking application 44 indicating that inmate 101 is in the vicinity of such wireless receiver 205A (and thus in the vicinity of the associated message board 503). Accordingly, location tracking application 44 can determine from such communication that inmate 101 is in the vicinity of message board 503.

Similarly, portable wireless transmitter 502 (e.g., RFID transponder) associated with inmate 501 communicates information identifying inmate 501 to wireless receiver (e.g., RFID antenna and transceiver) 205B, which is associated with message board 504. Wireless receiver 205B in turn communicates information to location tracking application 44 indicating that inmate 501 is in the vicinity of such wireless receiver 205B (and thus in the vicinity of the associated message board 504). Accordingly, location tracking application 44 can determine from such communication that inmate 501 is in the vicinity of message board 504.

In this embodiment, notification controller 109 queries location tracking application 44 for the location of inmate 101 so that controller 109 can determine where best to direct notification of the inmate's pending message. Responsive to such query, location tracking application 44 communicates information to controller 109 indicating that inmate 101 is in the vicinity of message board 503. Accordingly, notification controller 109 can trigger a message to message board 503 to notify inmate 101 of the pending message.

Similarly, notification controller 109 queries location tracking application 44 for the location of inmate 501 so that controller 109 can determine where best to direct notification of the inmate's pending message. Responsive to such query, location tracking application 44 communicates information to controller 109 indicating that inmate 501 is in the vicinity of message board 504. Accordingly, notification controller 109 can trigger a message to message board 504 to notify inmate 501 of the pending message.

Figure 6:
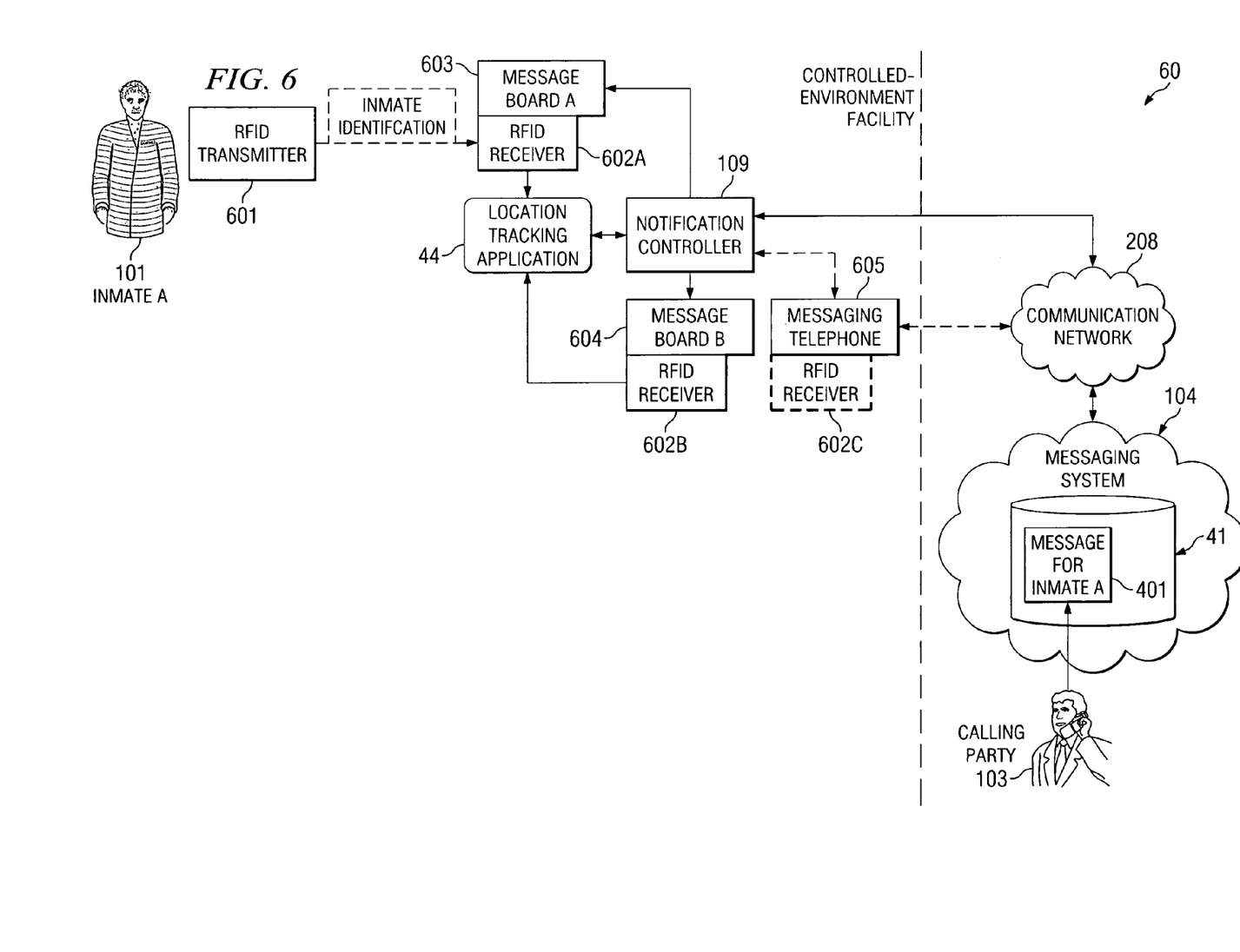
FIG. 6 shows an exemplary system which employs RFID for tracking the location of residents of a controlled-environment facility according to one embodiment of the present invention.

As mentioned above, in certain embodiments RFID is employed for tracking the location of the inmates. FIG. 6 shows an exemplary system 60 which employs RFID for tracking the location of inmates. As discussed above with system 40 of FIG. 4, system 60 comprises calling party 103, messaging system 104, communication network 208, and notification controller 109. In this example, message boards 603 and 604 are provided as communication devices (e.g., communication devices 105A and 105B of FIG. 1), which have RFID receivers (e.g., antenna and transceiver) 602A and 602B associated therewith, respectively. Calling party 103 (e.g., that is external to a correctional facility) interacts with messaging system 104 to record a message 401 for inmate 101, which is stored to data storage 41.

System 60 comprises inmate 101 having a portable RFID transmitter (e.g., transponder or tag) 601 associated therewith. Location tracking application 44 receives information from RFID receivers 602A and 602B to track the location of inmates within a controlled-environment facility (e.g., to determine which of message boards 603 and 604 an inmate is nearest at any given time). While two message boards with associated wireless receivers are shown in this example for ease of illustration, it should be understood that any number of communication devices (e.g., telephones, message boards, etc.) having associated wireless receivers may be included in a given implementation, and each of such wireless receivers may communicate with location tracking application 44 in the manner described herein for wireless receivers 602A and 602B. Location tracking application 44 communicates information regarding inmate location to notification controller 109 to enable notification controller 109 to determine an appropriate one of message boards 603 and 604 to direct notification of a pending message for a given inmate.

In operation of the illustrated example of FIG. 6, calling party 103 calls messaging system 104 and records a message 401 for inmate 101. Notification controller 109 receives notification of the pending message for inmate 101 (e.g., by receiving information pushed thereto from messaging system 104 or by polling messaging system 104 for such information). Thus, notification controller 109 determines that a message is pending for inmate 101, and therefore attempts to determine an appropriate one of message boards 603 and 604 to utilize to inform the inmate 101 of the pending message.

In the illustrated example, inmate 101 is in the vicinity of message board 603. Thus, RFID transmitter 601 (e.g., transponder) communicates information identifying inmate 101 to RFID receiver (e.g., antenna and transceiver) 602A, which is associated with message board 603. RFID receiver 602A in turn communicates information to location tracking application 44 indicating that inmate 101 is in the vicinity of such RFID receiver 602A (and thus in the vicinity of the associated message board 603). Accordingly, location tracking application 44 can determine from such communication that inmate 101 is in the vicinity of message board 603.

In this embodiment, notification controller 109 queries location tracking application 44 for the location of inmate 101. Responsive to such query, location tracking application 44 communicates information to controller 109 indicating that inmate 101 is in the vicinity of message board 603. Accordingly, notification controller 109 triggers a text message to be displayed on message board 603 that notifies inmate 101 of the pending message.

In this example, a dedicated messaging telephone 605 is provided, which is to be used by inmates for retrieving their messages. Thus, upon seeing on message board 603 that he has a pending message, inmate 101 may use messaging telephone 605 to call into messaging system 104 and retrieve (e.g., listen to) his pending message 401. In certain embodiments, messaging telephone 605 may be configured to only call to messaging system 104. Further, in certain embodiments, messaging telephone 605 may have associated therewith an RFID receiver 602C which is used for activating the telephone 605. For instance, RFID receiver 602C may determine the identity of an inmate attempting to use messaging telephone 605, and notification controller 109 (or other logic) may determine whether a message is pending in messaging system 104 for the identified inmate. If the inmate identified by RFID 602C does not have a message pending in messaging system 104, then the inmate may be denied use of messaging telephone 605 (e.g., messaging telephone 605 may not be activated and may play an error message or otherwise prevent the inmate for utilizing the telephone). On the other hand, if the inmate identified by RFID 602C does have a message pending in messaging system 104, then the inmate may be allowed use of messaging telephone 605 (e.g., messaging telephone 65 may be activated and connected to messaging system 104). Of course, criteria in addition to or instead of whether the inmate identified as attempting to use messaging telephone 605 has a message pending in messaging system 104 may be used for determining whether messaging telephone 605 is activated for use by the inmate.

Figure 7:
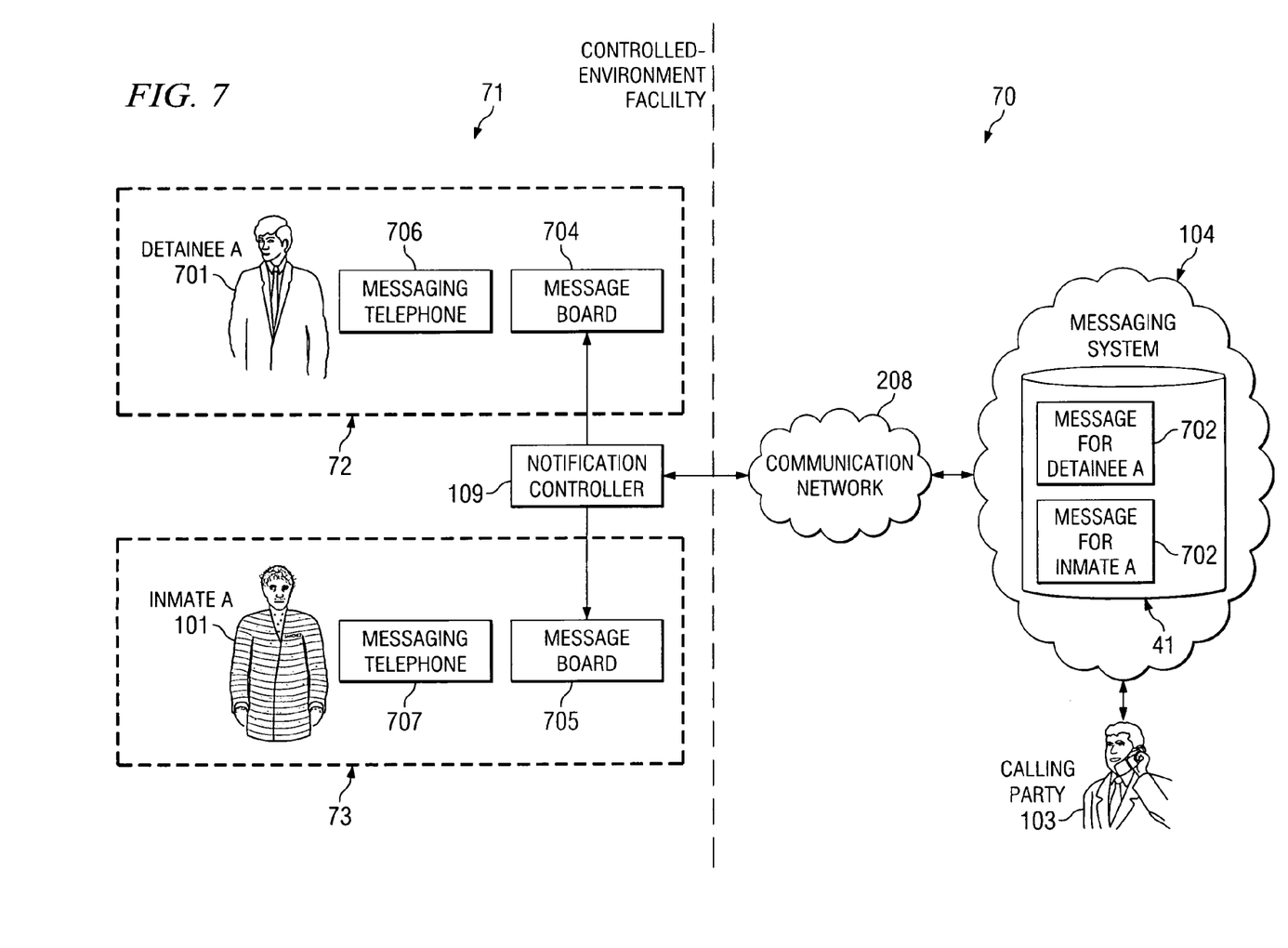
FIG. 7 shows an exemplary system that is employed for a correctional facility according to one embodiment of the present invention.

Embodiments of the present invention have particular application within controlled-environment facilities, such as correctional facilities. FIG. 7 shows one exemplary system 70 that is employed for a controlled-environment facility 71. In this example, the controlled-environment facility 71 is a correctional facility that comprises a detainee holding environment 72 and an inmate holding environment (e.g., long-term incarceration) 73. Notification controller 109 may be utilized to control the notification of messages to both detainees within environment 72 and inmates within environment 73 of the correctional facility.

Detainee 701 is held in detainee holding environment 72. Detainees, in general, are relatively new inmates to the correctional facility 71 that have not yet been processed to become long-term inmates of the correctional facility. For instance, detainees are newly arrested individuals that may not have been processed yet as to be assigned a personal identification number and/or other information used within the correctional facility's system for long-term inmates. Many detainees are released from the correctional facility (typically after they post bail) within 24 hours of being arrested.

In this example, detainee holding environment 72 includes message board 704 that is used to provide certain information to detainees, including notification of pending messages for the detainees. Detainee holding environment 72 also includes a messaging telephone 706, which, similar to messaging telephone 605 described above with FIG. 6, is operable to access messaging system 104 to enable detainees to retrieve messages therefrom.

Inmate holding environment 73, in this example, comprises message board 705 that is used to provide certain information to inmates, including notification of pending messages for the inmates. Further information, such as schedule information (e.g., time for recreation, etc.), meal menus, etc. may also be provided on message board 705. Inmate holding environment 73 also includes a messaging telephone 707, which, similar to messaging telephone 605 described above with FIG. 6, is operable to access messaging system 104 to enable inmates to retrieve messages therefrom.

As discussed above with system 40 of FIG. 4, system 70 comprises calling party 103, messaging system 104, communication network 208, and notification controller 109. In this example, message boards 704 and 705 are provided as communication devices (e.g., communication devices 105A and 105B of FIG. 1). Calling party 103 (e.g., that is external to correctional facility 71) interacts with messaging system 104 to record a message 702 for detainee 701 and a message 703 for inmate 101, which are stored to data storage 41. Notification controller 109 receives notification of the pending messages for inmate 101 and detainee 701 (e.g., by receiving information pushed thereto from messaging system 104 or by polling messaging system 104 for such information). Thus, notification controller 109 determines that a message is pending for inmate 101 and for detainee 701, and therefore attempts to determine an appropriate one of message boards 704 and 705 to utilize to inform the inmate 101 and detainee 701 of their respective pending messages.

In this example, notification controller 109 determines that message 703 is directed to an inmate (i.e., inmate 101 in this example), and thus directs notification of the pending message to message board 705 within inmate holding environment 73. Of course, a plurality of communication devices (e.g., message boards) may be included within inmate holding environment 73, and wireless location tracking techniques such as those described with FIGS. 1-6 above may be employed to enable notification controller 109 to determine which of such communication devices within the inmate holding environment 73 the notification should be directed. Once notified of his pending message, inmate 101 may utilize messaging telephone 707 to access messaging system 104 and retrieve his message 703.

Also in this example, notification controller 109 determines that message 702 is directed to a detainee (i.e., detainee 701 in this example), and thus directs notification of the pending message to message board 704 within detainee holding environment 72. Notification controller 109 may determine that the message is for a detainee using any of various techniques, including looking up in a database the status (i.e., detainee versus inmate) of the individual to whom a message is directed. In certain embodiments, a plurality of communication devices (e.g., message boards) may be included within detainee holding environment 72, and wireless location tracking techniques such as those described with FIGS. 1-6 above may be employed to enable notification controller 109 to determine which of such communication devices within the detainee holding environment 72 the notification should be directed. Once notified of his pending message, detainee 701 may utilize messaging telephone 706 to access messaging system 104 and retrieve his message 702.

While various examples are described above in which the location of the resident is monitored and used by notification controller 109 for determining an appropriate one of a plurality of communication devices to use for notifying the resident of a pending message, various other resident activity may be monitored and used in addition to or instead of location. For instance, in certain embodiments, calls of residents are monitored so as to track which telephone within the facility a given resident is using at any given time. For instance, a resident may input an identification number to gain authorization to use the telephone and/or an RFID reader associated with the telephone may receive identification information from an RFID tag associated with the resident, as examples. In certain embodiments, upon receiving notification that a message is pending for a given resident, notification controller 109 determines whether the given resident is currently using a telephone. If determined that the resident is using the telephone, the notification controller 109 may inform the resident of the pending message via the telephone that the resident is using. For instance, interrupt messaging techniques such as those described in U.S. Pat. No. 7,042,992, co-pending and commonly assigned U.S. patent applications: Ser. No. 11/386,032 and concurrently filed Ser. No. 11/480,264, the disclosures of which are hereby incorporated herein by reference, may be used to interrupt the call and provide the resident a message informing him of the pending message. In certain embodiments, upon receiving notification of a pending message for a given resident, notification controller 109 may wait until the given resident uses a telephone (or other communication device) within the facility, and then interrupt such communication to inform the resident (via such telephone or other communication device that was selected for use by the resident) of the pending message.

The messaging system 104, notification controller 109, and/or location tracking application 44 described above may be implemented in whole or in part internal or external to a controlled-environment facility for which they receive messages and manage notification of pending messages for residents thereof. For instance, in certain embodiments, messaging system 104 may be implemented in a central server that receives and stores messages for residents of one or more controlled-environment facilities (e.g., for a plurality of different correctional facilities). Alternatively, messaging system 104 may be implemented as a messaging system internal to a corresponding controlled-environment facility.

Similarly, notification controller 109 and location tracking application 44 may be implemented in a central server that manages notification of pending messages for one or more controlled-environment facilities. The various elements may be communicatively coupled via a communication network, such as a PSTN, wireless network, the Internet, etc., using well-known networking techniques. For instance, messaging system 104 may be communicatively coupled with notification controller 109 via a communication network, and notification controller 109 may be communicatively coupled with communication devices, such as communication devices 106 and 107 of FIG. 1, via a communication network. Similarly, location tracking application 44 may be communicatively coupled with notification controller 109 via a communication network. Likewise, location tracking application 44 may be communicatively coupled with wireless receivers, such as wireless receivers 205A and 205B of FIG. 4, via a communication network. Further, in certain embodiments, various parts of the messaging and notification system may be implemented in a distributed fashion. For example, message system 104, location tracking application 44, and notification controller 109 may each be implemented on different servers that are communicatively coupled together, and/or these elements may individually be distributed across a plurality of servers.

Although the present invention and its advantages have been described in detail, it should be understood that various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method comprising:
   receiving, at a notification controller, notification of a pending message for a resident of a controlled-environment facility;
   associating a separate transmitter with each of a plurality of different residents of the controlled environment facility, wherein each transmitter is operable to transmit wireless communication that identifies the respective resident with whom the transmitter is associated;
   receiving wireless communication from the transmitter associated with the resident, the wireless communication received at a receiver associated with one or more of a plurality of different communication devices;
   determining the one of the plurality of different communication devices that is nearest the resident based at least in part on the received wireless communication;
   determining, by the notification controller, an appropriate one of a plurality of different communication devices to use for notifying the resident of the pending message; and
   directing, by the notification controller, notification of the pending message to the determined appropriate communication device.

2. The method of claim 1 wherein the transmitter is a transponder.

3. The method of claim 1 wherein the transmitter and the receiver are part of a Radio Frequency Identification (RFID) system.

4. The method of claim 1 wherein the associating comprises at least one of:
   each of the plurality of different residents wearing a bracelet that includes the respective transmitter, each of the plurality of different residents wearing a badge that includes the respective transmitter, and physically coupling the transmitters to the respective residents.

5. The method of claim 1 further comprising:
   associating a separate receiver with each of the plurality of different communication devices within the controlled environment facility.

6. The method of claim 5 wherein the associating a separate receiver with each of the plurality of different communication devices comprises at least one of:
   coupling a receiver to an associated one of the plurality of different communication devices, and arranging separate receiver in the vicinity of an associated one of the plurality of different communication devices.

7. The method of claim 1 wherein said determining the appropriate one of a plurality of different communication devices comprises:
   determining the appropriate one of the plurality of different communication devices based at least in part on monitored activity of the resident.

8. The method of claim 7 wherein the monitored activity comprises location of the resident within the controlled-environment facility.

9. The method of claim 7 wherein the monitored activity comprises use of the plurality of different communication devices.

10. The method of claim 1 wherein the pending message comprises a telephone message.

11. A method comprising:
    receiving, at a notification controller, notification of a pending message for a resident of a controlled-environment facility;
    determining, by the notification controller, an appropriate one of a plurality of different communication devices to use for notifying the resident of the pending message based at least in part on determining that the resident is using the appropriate one of the plurality of different communication devices; and
    directing, by the notification controller, notification of the pending message to the determined appropriate communication device.

12. The method of claim 11 wherein said directing notification of the pending message to the determined appropriate communication device comprises:
    interrupting communication of the determined appropriate one of the plurality of different communication devices being used by the resident to notify the resident of the pending message.

13. A method comprising:
    receiving, at a notification controller, notification of a pending message for a resident of a controlled-environment facility;
    determining, by the notification controller, an appropriate one of a plurality of different communication devices to use for notifying the resident of the pending message;
    directing, by the notification controller, notification of the pending message to the determined appropriate communication device;
    receiving a return message from the resident for a party whom the pending message is from; and
    directing notification of the return message to the party.

14. The method of claim 13 further comprising:
    permitting the resident to record the return message free of charge; and
    charging a fee to the party for retrieving the return message.

15. A method comprising:
    associating a wireless transmitter with a resident of a controlled-environment facility, wherein said wireless transmitter transmits information identifying the resident, wherein associating the wireless transmitter with the resident comprises at least one of: the resident wearing a bracelet that includes the transmitter, the resident wearing a badge that includes the transmitter, and physically coupling the transmitters to the resident;

associating with each of a plurality of communication devices a respective wireless receiver that is operable to receive transmitted information from the wireless transmitter when the wireless transmitter is in vicinity thereof;

receiving, into a messaging system, a message for the resident;

receiving, at a notification controller, notification of the message;

determining, based at least in part on the wireless receivers, one of the plurality of communication devices that is in vicinity of the resident; and directing, by said notification controller, notification of the message to the determined one of the plurality of communication devices.

16. The method of claim 15 wherein the wireless transmitter is a transponder.

17. The method of claim 16 wherein the transponder is part of a Radio Frequency Identification (RFID) system.

18. The method of claim 17 wherein the wireless receiver is part of the RFID system.

19. The method of claim 15 wherein associating with each of the plurality of communication devices a respective wireless receiver comprises at least one of:

coupling the wireless receivers to the respective communication device, and arranging separate ones of the respective wireless receivers in the vicinity of an associated one of the plurality of different communication devices.

20. A method comprising:

associating a wireless transmitter with a resident of a controlled-environment facility, wherein said wireless transmitter transmits information identifying the resident;

associating with each of a plurality of communication devices a respective wireless receiver that is operable to receive transmitted information from the wireless transmitter when the wireless transmitter is in vicinity thereof;

receiving, into a messaging system, a message for the resident;

receiving, at a notification controller, notification of the message;

determining, based at least in part on the wireless receivers, one of the plurality of communication devices that is in vicinity of the resident;

directing, by said notification controller, notification of the message to the determined one of the plurality of communication devices;

receiving, into the messaging system, a return message from the resident for a party whom the message for the resident is from; and directing notification of the return message to the party.

21. The method of claim 20 further comprising:

permitting the resident to record the return message to the messaging system free of charge; and charging a fee to the party for retrieving the return message from the messaging system.

22. A system comprising:

a plurality of communication devices within a controlled-environment facility, each of the plurality of communication devices having a respective wireless receiver associated therewith;

a wireless transmitter associated with a resident of the controlled-environment facility, the wireless transmitter operable to transmit identification of the resident with whom it is associated, wherein the wireless transmitter is associated with the resident by at least one of the following: the resident wearing a bracelet that includes the transmitter, the resident wearing a badge that includes the transmitter, and physically coupling the transmitters to the resident;

a messaging system operable to receive a message for the resident; and a notification controller operable to
determine that the message for the resident is received by the messaging system,
determine, based at least in part on the wireless receivers, one of the plurality of communication devices that the resident is nearest, and
direct notification of the message for the resident to the determined one of the plurality of communication devices that the resident is nearest.

23. The system of claim 22 wherein the wireless transmitter is a transponder.

24. The system of claim 23 wherein the transponder is part of a Radio Frequency Identification (RFID) system.

25. The system of claim 24 wherein the wireless receivers are part of the RFID system.

26. The system of claim 22 wherein each of the plurality of communication devices have the respective wireless receiver associated therewith by at least one of the following:

coupling the respective wireless receiver to the communication device with which the wireless receiver is associated, and arranging separate ones of the respective wireless receivers in the vicinity of an associated one of the plurality of different communication devices.

27. A system comprising:

a message board that is operable to output textual messages to residents of a controlled-environment facility;

a messaging system operable to receive a message for a resident of the controlled-environment facility; and a notification controller operable to
determine that the message for the resident is received by the messaging system,
and
direct notification of the message for the resident to the message board.

28. The system of claim 27 wherein the notification includes instructions about how to retrieve the message.

29. The system of claim 27 wherein the notification controller is operable to determine an appropriate one of a plurality of different message boards within the controlled-environment facility to which to direct the notification of the message for the resident.

30. The system of claim 29 wherein the notification controller determines the appropriate one of the plurality of different message boards based at least in part on activity of the resident.

31. The system of claim 30 wherein the activity of the resident comprises location of the resident within the facility.

32. The system of claim 31 wherein the notification controller determines as the appropriate one of the plurality of different message boards the one of the plurality of different message boards to which the resident is nearest.

33. The system of claim 32 wherein a Radio Frequency Identification (RFID) system is used to determine which of the plurality of different message boards to which the resident is nearest.

34. A system comprising:

a plurality of communication devices within a controlled-environment facility;

a messaging system operable to:

a) receive a message from a party outside the controlled-environment facility for a resident of the controlled-environment facility, and
b) receive a message from the resident of the controlled-environment facility for the party outside the controlled-environment facility; and an information dissemination manager operable to:
  a) manage notification of the resident of a pending message for the resident in the messaging system, including selecting one of the plurality of communication devices to which to direct notification of the pending message for the resident, and
  b) manage notification of the party outside the controlled-environment facility of a pending message for the party in the messaging system.

* * * * *

UNITED STATES PATENT AND TRADEMARK OFFICE
CERTIFICATE OF CORRECTION

PATENT NO.        : 7,519,375 B2                                        Page 1 of 1
APPLICATION NO.   : 11/479950
DATED             : April 14, 2009
INVENTOR(S)       : Polozola et al.

It is certified that error appears in the above-identified patent and that said Letters Patent is hereby corrected as shown below:

In the drawings, Sheet 6 of 6, the reference number for MESSAGE FOR INMATE A, delete "702" and insert --703--.
In Col. 1, line 20, after "following" insert --co-pending--.
In Col. 10, lines 42-43, delete "105A and 105B" and insert --106 and 107--.
In Col. 12, line 15, delete "105A and 105B" and insert --106 and 107--.
In Col. 12, line 43, delete "504" and insert --501--.
In Col. 13, line 35, delete "105A and 105B" and insert --106 and 107--.
In Col. 14, line 45, delete "65" and insert --605--.
In Col. 15, lines 28-29, delete "105A and 105B" and insert --106 and 107--.

Signed and Sealed this

Twenty-sixth Day of May, 2009

JOHN DOLL
*Acting Director of the United States Patent and Trademark Office*